No. 821,794. PATENTED MAY 29, 1906.
L. FRANZMEIER.
WINDROWER.
APPLICATION FILED MAR. 13, 1905.
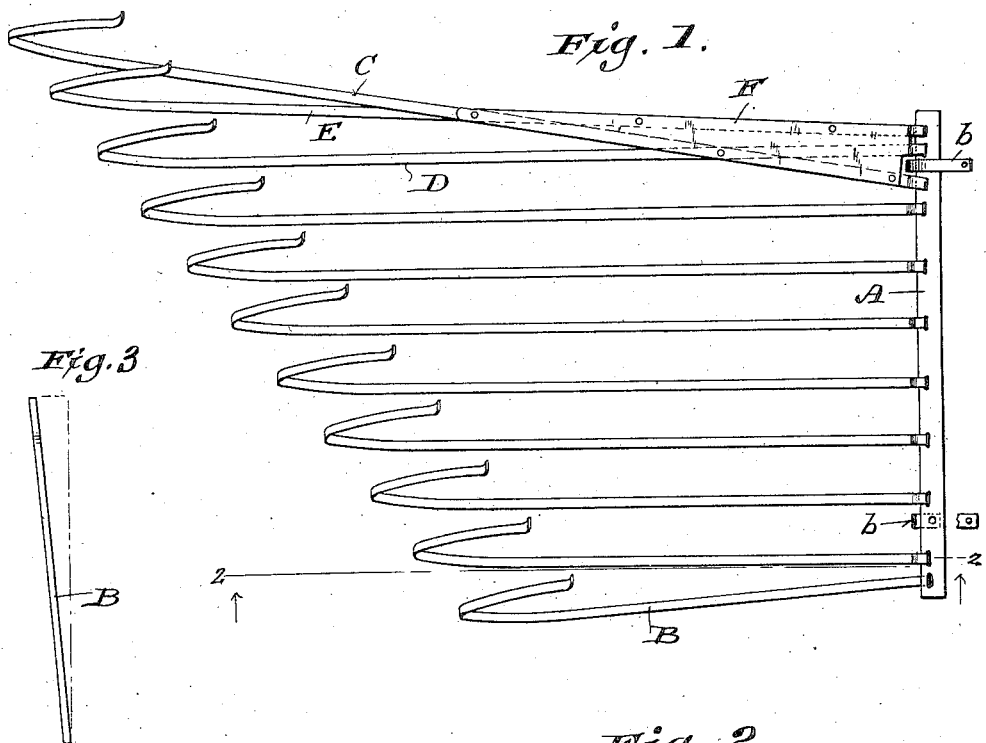
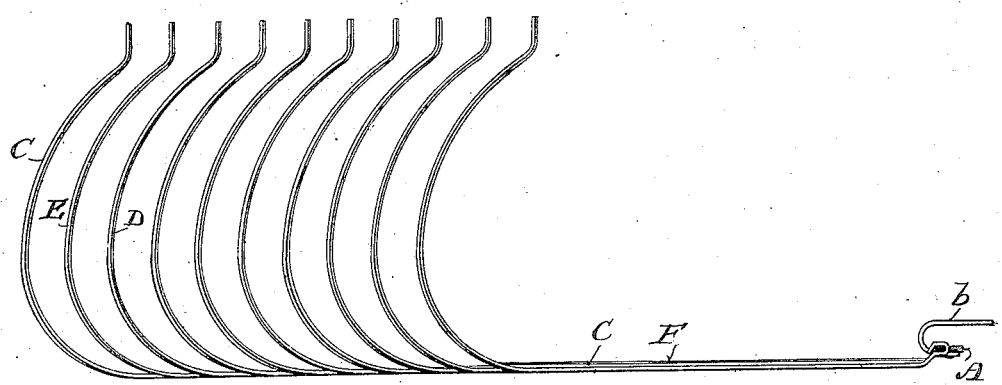

UNITED STATES PATENT OFFICE.

LOUIS FRANZMEIER, OF NEWTON, WISCONSIN.

WINDROWER.

No. 821,794.        Specification of Letters Patent.        Patented May 29, 1906.

Application filed March 13, 1905. Serial No. 249,732.

*To all whom it may concern:*

Be it known that I, LOUIS FRANZMEIER, a citizen of the United States, and a resident of Newton, in the county of Manitowoc and State of Wisconsin, have invented certain new and useful Improvements in Windrowers; and I do hereby declare that the following is a full, clear, and exact description thereof.

My invention has for its object to provide simple, economical, and efficient side-delivery windrowers especially designed as attachments for mowing-machines employed to cut pea-vines; and it consists in certain peculiarities of construction and combination of parts hereinafter particularly set forth with reference to the accompanying drawings and subsequently claimed.

Figure 1 of the drawings represents a plan view of a side-delivery windrower in accordance with my invention; Fig. 2, a sectional view of the same on the plane indicated by line 2 2 in Fig. 1, and Fig. 3 a rear elevation of one of the slats of the windrower.

Referring by letter to the drawings, A indicates a bar having clips $b$ in connection therewith for attachment to the rear of a finger-bar of a mowing-machine. At intervals of its length the bar A is provided with slots, and slats are recurved at their forward ends through the slots in said bar. Hence no riveting is required for connecting the bar and slats. The slats are bent adjacent to the bar A to drop their horizontal portions a suitable distance below the same, and cut pea-vines coming over said bar get a better grip on the ground to insure rolling of a windrow. The slats are of gradually-increasing length, the outermost slat B being the shortest and preferably divergent in a rearward direction from the one next adjacent. The rear ends of all the slats are shown forwardly bowed, inwardly inclined, and upwardly bent. Fig. 3 illustrates the inward inclination of one of the slats, and by having the bows of all the slats inwardly inclined the pea-pods catching on their edges will move freely with a rolling mass of vines, so as not to be severed from the same, the rear ends of said slats being also preferably upwardly bent to prevent severing of pods from vines caught in the windrower to be rolled out from the inner side of same. While the inwardly inclining of the bowed ends of the slats is preferable, it is not absolutely essential as a detail of my invention.

The longest slat C is crossed on the slats D E, and an upper triangular plate F, riveted to the horizontal portions of the slats C D back of the inner end of the bar A, prevents catching and clogging of the windrow. Hence ready continued clearance of said windrow is insured. There is a divergence of the bowed rear ends of the crossed slats C E, and these slats are both divergent from the slat D, on which the one C is also crossed, but the slats between the one D and the outermost slat B are approximately parallel. The aforesaid disposition of the innermost slats insures a further rolling of the windrow in the proper direction to insure good clearance for the next time around of the mowing-machine to which the windrower is attached.

Having thus described my invention, what I claim as new, and desire to secure by Letters Patent, is—

1. A windrower comprising a bar for attachment to the rear of the finger-bar of a mowing-machine, slats having their forward ends fastened to the bar first aforesaid and rearwardly extended on a horizontal plane below the same, the outermost slat being the shortest, the others of gradually-increasing length, the longest crossed on the next two, the latter being rearwardly divergent from one another and all of them having forwardly-bowed rear ends; and a plate surmounting the horizontal portions of the crossed slats.

2. A windrower comprising a bar for attachment to the rear of the finger-bar of a mowing-machine, slats having their forward ends fastened to the bar first aforesaid and rearwardly extended on a horizontal plane below the same, the outermost slat being the shortest and rearwardly divergent from the one next outermost, the others of gradually-increasing length, the longest crossed on the next two, the latter being rearwardly divergent from one another and all of them having forwardly-bowed rear ends; and a plate surmounting the horizontal portions of the crossed slats.

In testimony that I claim the foregoing I have hereunto set my hand, at Newton, in the county of Manitowoc and State of Wisconsin, in the presence of two witnesses.

LOUIS FRANZMEIER.

Witnesses:
J. C. WILLINGER,
P. J. McMAHON.